United States Patent
Molla et al.

(10) Patent No.: US 12,234,725 B2
(45) Date of Patent: Feb. 25, 2025

(54) METHODS AND SYSTEMS FOR PREDICTING FLUID TYPE WHILE GEOSTEERING

(71) Applicant: Schlumberger Technology Corporation, Sugar Land, TX (US)

(72) Inventors: Shahnawaz Hossain Molla, Acton, MA (US); Maneesh Pisharat, Bucharest (RO); Morten Kristensen, Lysaker (NO); Ilaria De Santo, Milan (IT); Shahid Azizul Haq, Bellaire, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/700,133

(22) PCT Filed: Oct. 18, 2022

(86) PCT No.: PCT/US2022/046977
§ 371 (c)(1),
(2) Date: Apr. 10, 2024

(87) PCT Pub. No.: WO2023/081011
PCT Pub. Date: May 11, 2023

(65) Prior Publication Data
US 2024/0418085 A1 Dec. 19, 2024

Related U.S. Application Data

(60) Provisional application No. 63/275,317, filed on Nov. 3, 2021.

(51) Int. Cl.
*E21B 49/08* (2006.01)
*E21B 47/07* (2012.01)
*E21B 49/00* (2006.01)

(52) U.S. Cl.
CPC .......... *E21B 49/0875* (2020.05); *E21B 47/07* (2020.05); *E21B 49/005* (2013.01); *E21B 2200/22* (2020.05)

(58) Field of Classification Search
CPC ..... E21B 47/07; E21B 49/005; E21B 49/0875
See application file for complete search history.

(56) References Cited

U.S. PATENT DOCUMENTS

| | | |
|---|---|---|
| 6,443,001 B1 | 9/2002 | Duriez et al. |
| 7,392,138 B2 | 6/2008 | Frechin et al. |

(Continued)

FOREIGN PATENT DOCUMENTS

| | | |
|---|---|---|
| WO | 2009142873 A1 | 11/2009 |
| WO | 2018208634 A1 | 11/2018 |
| WO | 2020185094 A1 | 9/2020 |

OTHER PUBLICATIONS

Halpern et al. "Implementation of Geochemical Technology for "Real-Time" Tar Assessment and Geosteering: Saudi Arabia," Offshore Mediterranean Conference and Exhibition in Ravenna Italy (Year: 2007).*

(Continued)

*Primary Examiner* — John Fitzgerald
(74) *Attorney, Agent, or Firm* — Jeffrey D. Frantz (57) ABSTRACT

A method for predicting fluid properties includes measuring one or more measured fluid properties of a mud gas at a surface of a wellbore. The method also includes measuring one or more mud gas properties of the mud gas at the surface of the wellbore. The method also includes predicting one or more first predicted fluid properties using one or more pre-trained machine-learning (ML) models. The one or more first predicted fluid properties are predicted based at least partially upon the one or more mud gas properties. The method also includes comparing the one or more measured fluid properties to the one or more first predicted fluid (Continued)

properties. The method also includes re-training the one or more pre-trained ML models to produce one or more re-trained ML models in response to the comparison.

18 Claims, 8 Drawing Sheets

(56) References Cited

U.S. PATENT DOCUMENTS

| | | | | |
|---|---|---|---|---|
| 8,061,444 | B2* | 11/2011 | Mullins | E21B 47/022 |
| | | | | 175/45 |
| 9,482,781 | B2* | 11/2016 | Kamal | H02J 7/0042 |
| 10,901,115 | B2* | 1/2021 | Kirkwood | E21B 7/04 |
| 11,015,424 | B2* | 5/2021 | Samuel | E21B 47/024 |
| 11,492,900 | B2* | 11/2022 | Wright | E21B 49/005 |
| 2014/0238670 | A1* | 8/2014 | Pop | E21B 49/10 |
| | | | | 166/264 |
| 2018/0347354 | A1 | 12/2018 | Li | |
| 2019/0169986 | A1 | 6/2019 | Storm, Jr. | |
| 2019/0376386 | A1* | 12/2019 | Wright | E21B 49/005 |
| 2020/0041689 | A1* | 2/2020 | Kirkwood | E21B 7/04 |
| 2021/0062650 | A1* | 3/2021 | Molla | E21B 49/086 |
| 2024/0318551 | A1* | 9/2024 | Cely | E21B 47/00 |

OTHER PUBLICATIONS

Torre et al. "Geosteering. Full formation evaluation including Sw, K and PhiT using Surface Logging Advanced Gas Data," 78th EAGE Conference and Exhibition, Vienna, Austria (Year: 2016).*

Nurmi et al. "Horizontal Highlights" Middle East Well Evaluation Review, No. 16 (Year: 1995).*

Molla et al. "Predicting Reservoir Fluid Properties From Advanced Mud Gas Analysis Using Machine Learning Tools," 15th OMC Med Energy Conference and Exhibition, Ravenna Italy (Year: 2021).*

Beer et al., Geosteering and/or Reservoir Characterization The Prowess of New-Generation LWD Tools. SPWLA 51st Annual Logging Symposium, Perth, Australia, Jun. 2010, 14 pages.

Fornasier et al., The Essential Role of the Advanced Surface Fluid Logging in the Reservoir Fluid Evaluation Workflow. SPWLA 56th Annual Logging Symposium. Long Beach, California, USA, Jul. 18, 2015, 17 pages.

Kyi et al., Integration of Downhole Fluid Analysis and Advanced Mud Gas Logging Reduces Uncertainty in Reservoir Evaluation. International Petroleum Technology Conference, Doha, Qatar, Jan. 2014, 13 pages.

Rochon, R. W. (1978). "Can In-situ Reservoir Hydrocarbon Composition Be Predicted From Hydrocarbon Analysis Of The Mud Stream" The Log Analyst 19(01): 18 pages, 1978.

Seydoux, J. "Mapping while drilling goes live." Offshore Engineering, 2014, 3 pages.

Wilson, T. The Quantification Of Mud Log Gas Shows. SPWLA 17th Annual Logging Symposium. Denver, Colorado, Society of Petrophysicists and Well-Log Analysts, Jun. 1976, 10 pages.

James et al., An Introduction to Statistical Learning with Applications in R. Springer Texts in Statistics. 2013—pp. 15-36.

Hastie, T., R. Tibshirani, and J. Friedman, The Elements of Statistical Learning. 200, pp. 18-32.

* cited by examiner

METHODS AND SYSTEMS FOR PREDICTING FLUID TYPE WHILE GEOSTEERING

CROSS-REFERENCE TO RELATED APPLICATIONS

This application is a National Stage Entry of International Application No. PCT/US2022/046977, filed on Oct. 18, 2022, which claims priority to U.S. Provisional Patent Application No. 63/275,317, filed on Nov. 3, 2021, the entirety of which is incorporated by reference.

BACKGROUND

Geosteering may be used to control a wellbore based on geological information, to keep a directional wellbore within a pay zone and maximize the economic production from the wellbore. Geosteering includes intentional directional control of the wellbore based on the results of downhole geological logging measurements rather than three-dimensional targets in space, usually to keep a directional wellbore within the pay zone. In mature areas, geosteering may be used to keep the wellbore in a particular section of a reservoir to minimize gas or water breakthrough and maximize economic production from the wellbore.

Technology can be used to provide a reservoir mapping-while-drilling service. This service allows "looking" 30 m deep (e.g., using resistivity) into the reservoir to visualize the geological structure (e.g., bed boundaries, faults, fluid contacts, etc.) around the wellbore while drilling as well as the formation ahead of the drill bit. By combining the resistivity information with logging-while-drilling (LWD) measurements, real-time information to land wells may be available with reduced drilling risks. However, the resistivity-based measurement may not offer sufficient contrast to distinguish between different types of hydrocarbon fluids, such as oil, gas condensate, and/or gas, which may be present in the reservoir. Thus, a pilot well may be drilled to characterize the fluid in the target reservoir and geosteer the wellbore assuming that the fluid composition remains unchanged in the target. Such an assumption may be invalid when the drill path encounters faults and/or barriers in the reservoir which can create fluid compartmentalization. Fluid variation in the wellbore may have an impact on completions and flow assurance during production.

Downhole fluid samples may be collected and analyzed in the fluid laboratory to investigate fluid complexity in the well profile. However, this process is time-consuming, taking weeks to months in most cases to obtain reliable laboratory results. Thus, in many situations where downhole measurements do not show a reliable contrast between different types of fluids, the operator does not have actionable fluid information to help make geosteering decisions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for predicting fluid properties is disclosed. The method includes measuring one or more measured fluid properties of a mud gas at a surface of a wellbore. The method also includes measuring one or more mud gas properties of the mud gas at the surface of the wellbore. The method also includes predicting one or more first predicted fluid properties using one or more pre-trained machine-learning (ML) models. The one or more first predicted fluid properties are predicted based at least partially upon the one or more mud gas properties. The method also includes comparing the one or more measured fluid properties to the one or more first predicted fluid properties. The method also includes re-training the one or more pre-trained ML models to produce one or more re-trained ML models in response to the comparison.

A non-transitory computer-readable medium is also disclosed. The medium stores instructions that, when executed by at least one processor of a computing system, cause the computing system to perform operations. The operations include measuring one or more measured fluid properties of a mud gas at a surface of a wellbore. The one or more measured fluid properties include a fluid type, a fluid composition, a gas-oil ratio (GOR), or a combination thereof. The wellbore is a deviated or lateral wellbore. The operations also include measuring one or more mud gas properties of the mud gas at the surface of the wellbore. The one or more mud gas properties include a composition of molecules in the mud gas, a pressure of the mud gas, a temperature of the mud gas, or a combination thereof. The operations also include predicting one or more first predicted fluid properties using one or more pre-trained machine-learning (ML) models. The one or more first predicted fluid properties are predicted based at least partially upon the one or more mud gas properties. The one or more first predicted fluid properties include the fluid type, the fluid composition, and the GOR. The operations also include performing a first comparison of the one or more measured fluid properties to the one or more first predicted fluid properties. The operations also include re-training the one or more pre-trained ML models to produce one or more re-trained ML models in response to the first comparison being greater than a first predetermined threshold. The operations also include predicting one or more second predicted fluid properties using the one or more re-trained ML models. The one or more second predicted fluid properties include the fluid type, the fluid composition, the GOR, or a combination thereof. The operations also include performing a second comparison of the one or more measured fluid properties to the one or more second predicted fluid properties. The operations also include determining a geosteering response for a downhole tool that is drilling the wellbore in response to the second comparison being less than the first predetermined threshold.

A computing system is also disclosed. The computing system includes one or more processors and a memory system. The memory system includes one or more non-transitory computer-readable media storing instructions that, when executed by at least one of the one or more processors, cause the computing system to perform operations. The operations include measuring one or more measured fluid properties of a mud gas at a surface of a wellbore. The one or more measured fluid properties comprise a fluid type, a fluid composition, a gas-oil ratio (GOR), or a combination thereof. The wellbore includes a deviated or lateral wellbore. The operations also include comparing the one or more measured fluid properties with one or more corresponding measured fluid properties that are measured in a pilot well. The operations also include converting the one or more measured fluid properties, the one or more corresponding measured fluid properties, or a combination thereof into a converted data format. The operations also include measuring one or more mud gas properties of the mud gas at the surface of the wellbore. The one or more mud gas properties include a composition of molecules in the mud gas, a pressure of the mud gas, a temperature of the mud gas, or a combination thereof. The operations also include normalizing the one or more mud gas properties to produce one or more normalized mud gas properties. The operations also include predicting one or more first predicted fluid properties using one or more pre-trained machine-learning (ML) models. The one or more first predicted fluid properties are predicted based at least partially upon the one or more normalized mud gas properties. The one or more first predicted fluid properties include the fluid type, the fluid composition, the GOR, or a combination thereof. The operations also include performing a first comparison of the one or more measured fluid properties in the converted data format to the one or more first predicted fluid properties. The operations also include re-training the one or more pre-trained ML models to produce one or more re-trained ML models in response to the first comparison being greater than a first predetermined threshold. The operations also include predicting one or more second predicted fluid properties using the one or more re-trained ML models. The one or more second predicted fluid properties include the fluid type, the fluid composition, the GOR, or a combination thereof. The operations also include performing a second comparison of the one or more measured fluid properties in the converted data format to the one or more second predicted fluid properties. The operations also include determining a geosteering response for a downhole tool that is drilling the wellbore in response to the second comparison being less than the first predetermined threshold.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The system and method described herein may be used to predict fluid properties in a subterranean formation based at least partially upon mud gas data. More particularly, the system and method may predict and/or estimate reservoir fluid properties from advanced mud gas analysis data, and these properties may be used for well placement and/or geosteering.

Figure 1:
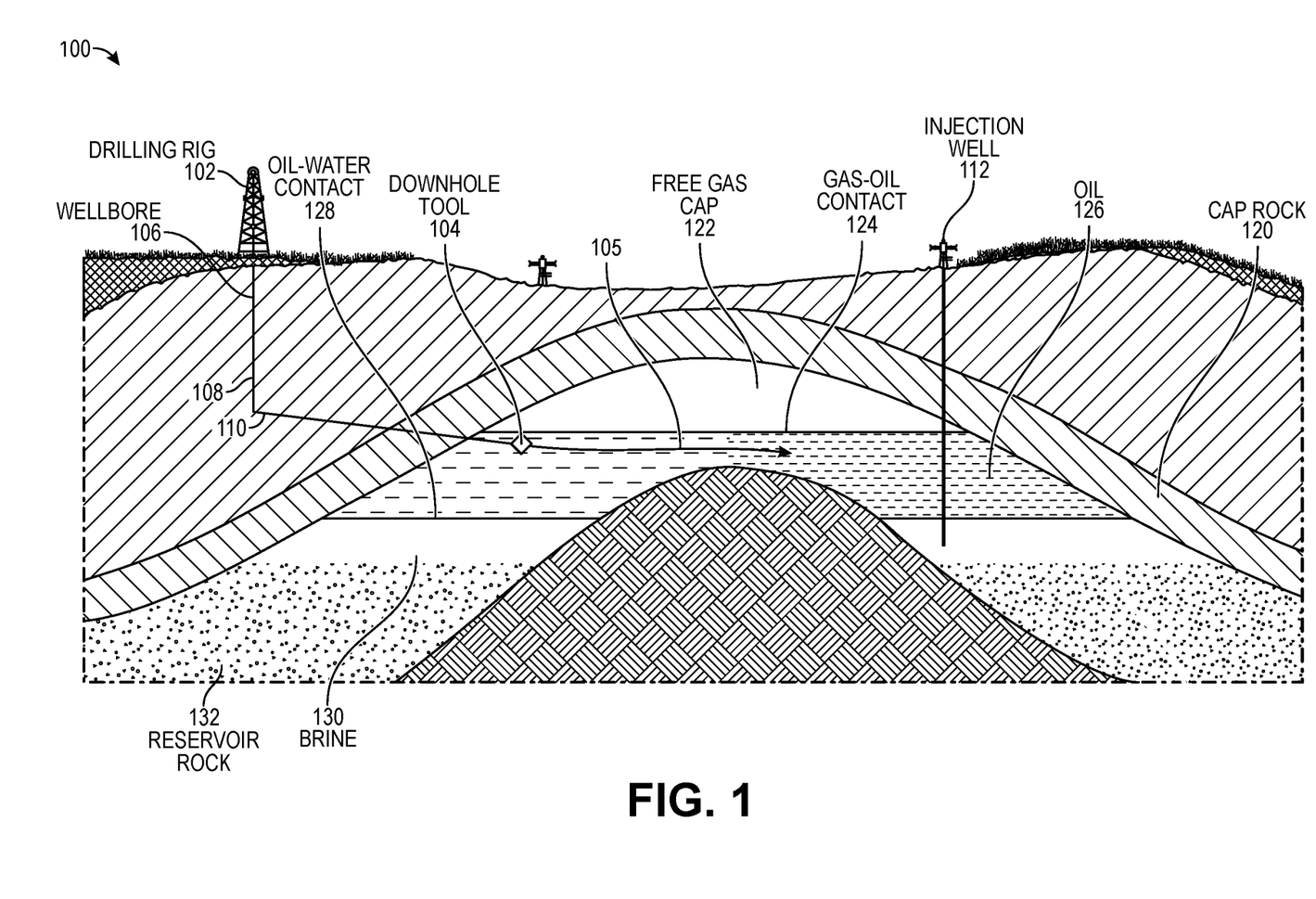
FIG. 1 illustrates a schematic side view of a wellsite, according to an embodiment.

FIG. 1 illustrates a schematic side view of a wellsite 100, according to an embodiment. The wellsite 100 may include a drilling rig 102 positioned over a subterranean formation. A downhole tool 104 may extend downward from the drilling rig 102 and drill a wellbore 106 in the subterranean formation. As shown, the wellbore 106 may include a first (e.g., vertical) portion 108 and a second (e.g., non-vertical) portion 110. The second portion 110 may be referred to as deviated or horizontal. In at least one embodiment, the wellsite 100 may also include a second wellbore 112, which may be or include a pilot wellbore. The second wellbore 112 may be drilled before, simultaneously with, or after the (first) wellbore 106.

The subterranean formation may include a plurality of different layers. In the example shown in FIG. 1, the subterranean formation may include a cap rock layer 120, a free gas cap 122, a gas-oil contact 124, an oil layer 126, an oil-water contact 128, a brine layer 130, and a reservoir rock layer 132. The downhole tool 104 may be geosteered along a drilling trajectory 105 through the cap rock layer 120 into the oil layer 126.

Figure 2:
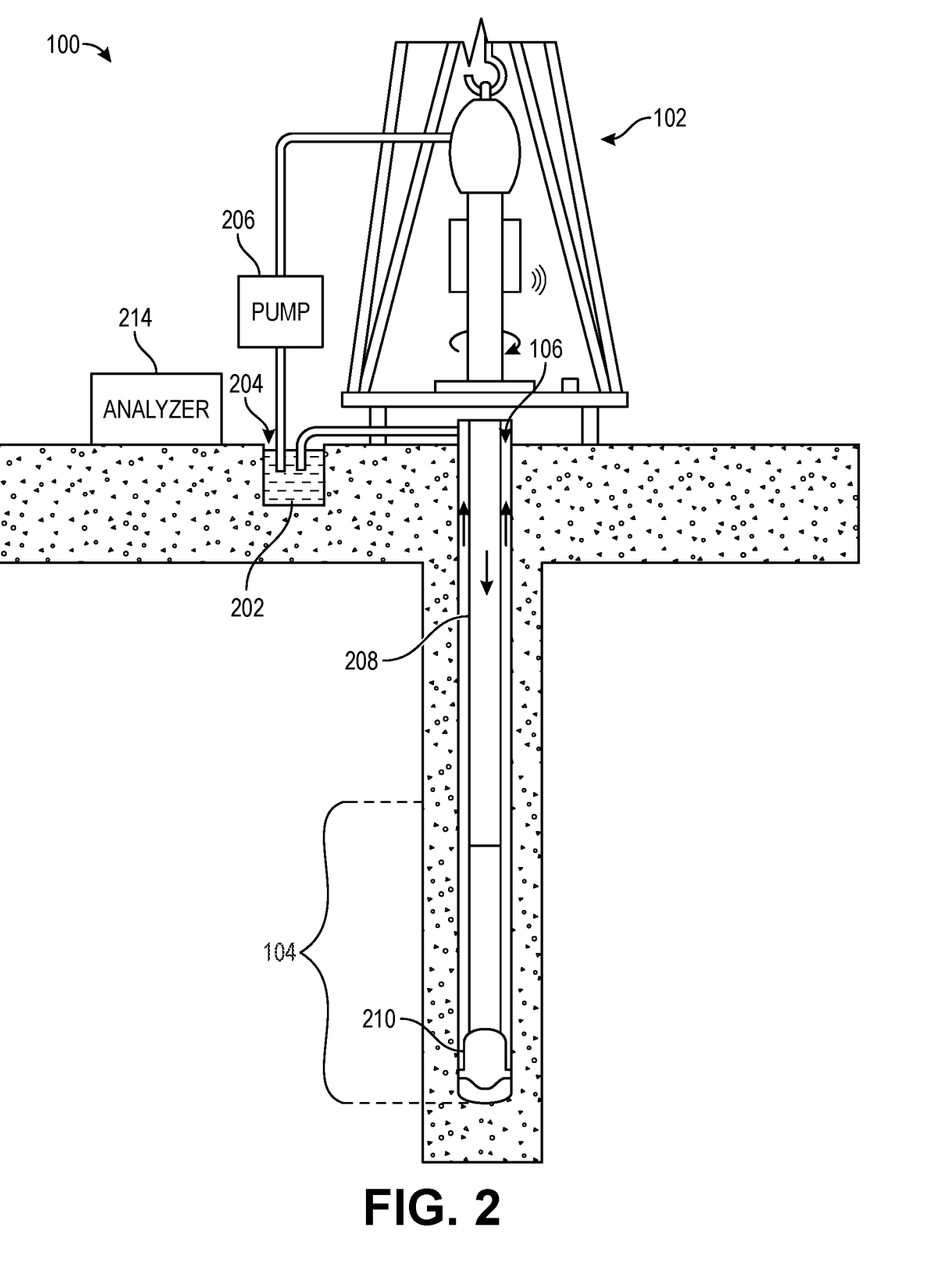
FIG. 2 illustrates an enlarged schematic side view of a portion of the wellsite, according to an embodiment.

FIG. 2 illustrates an enlarged schematic side view of the wellsite 100 including the drilling rig 102, the downhole tool 104, and the wellbore 106, according to an embodiment. Drilling fluid (also referred to as mud or drilling mud) 202 may be stored in a pit 204 at the wellsite 100. A pump (e.g., a mud pump) 206 may deliver the drilling fluid 202 to an interior of a drill string 208 in the wellbore 106, which causes the drilling fluid 202 to flow downwardly through the drill string 208. The drilling fluid 202 exits the drill string 208 via ports in a drill bit 210 of the downhole tool 104, and then circulates upwardly through an annulus region between the outside of the drill string 208 and a wall of the wellbore 106. The drilling fluid 202 may carry formation cuttings and/or formation fluids up to the surface as it is returned to the pit 204 for recirculation. The formation fluids may include liquid and/or gas. The gas may be referred to as mud gas.

The drilling fluid 202 (e.g., the mud gas) may be sampled and analyzed by a drilling fluid analyzer 214 at the surface. The surface mud gas measurements may provide information about the subterranean formation (e.g., the reservoir fluids), which may be used to geosteer the downhole tool 104. More particularly, the surface mud gas data may be used to estimate the reservoir fluid properties in the wellbore 106 in substantially real-time (e.g., within 1 hour or less, 30 minutes or less, 10 minutes or less, etc.). As described below, the surface mud gas data may be used to generate a continuous fluid log along the well trajectory 105 that can provide actionable insight into fluid variability and help to minimize uncertainties in understanding fluid distribution resulting from lateral heterogeneities that influence production success. The fluid log can be helpful mature fields where migration of fluids due to depletion and advancement of an injected gas front increases complexity in making geosteering decisions.

Advanced Mud Gas Analysis

Mud gas analysis during drilling produces early information about the hydrocarbons (HC) in the reservoir. Variation in gas concentrations in the drilling mud may be controlled by numerous factors and can be broadly attributed to drilling parameters and environment changes, or formation fluid and drilling fluid changes. Due to these limiting factors, conventional methodology was previously focused on establishing qualitative results. Hence, identifying the effect of these variables, applying corrections, and removing artifacts may be used during the quality control process before attempting mud gas interpretation. Reliable and quantitative mud gas data may be used to make real-time decisions about the asset in the early stage of exploration and development.

Advanced mud gas (AMG) analysis can provide accurate gas composition (e.g., lab quality) of the reservoir fluids during drilling. AMG data may be used for HC and fluid contacts identification, as well as inter- and intra-well fluid facies mapping. Gas composition from AMG can guide sampling and downhole fluid analysis, as well as early detection of reservoir complexities (e.g., tight, thin layered, etc).

Figure 3A:
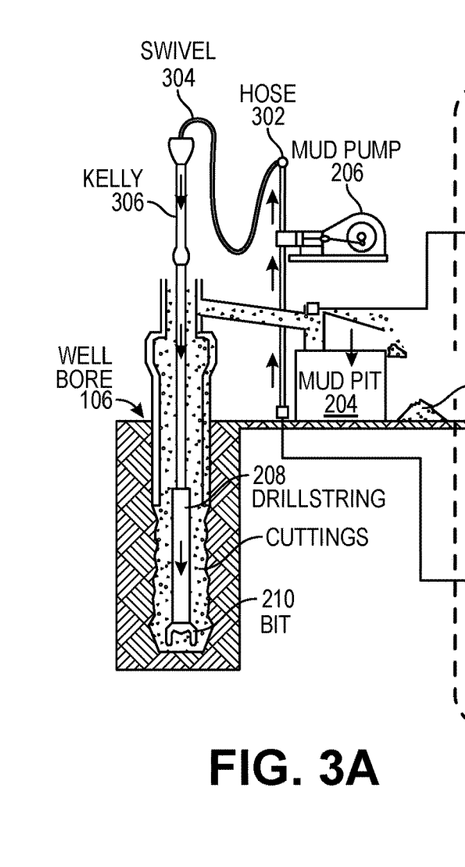
FIGS. 3A and 3B illustrate schematic views of a mud gas analysis process that may take place at the wellsite, according to an embodiment.
Figure 3B:
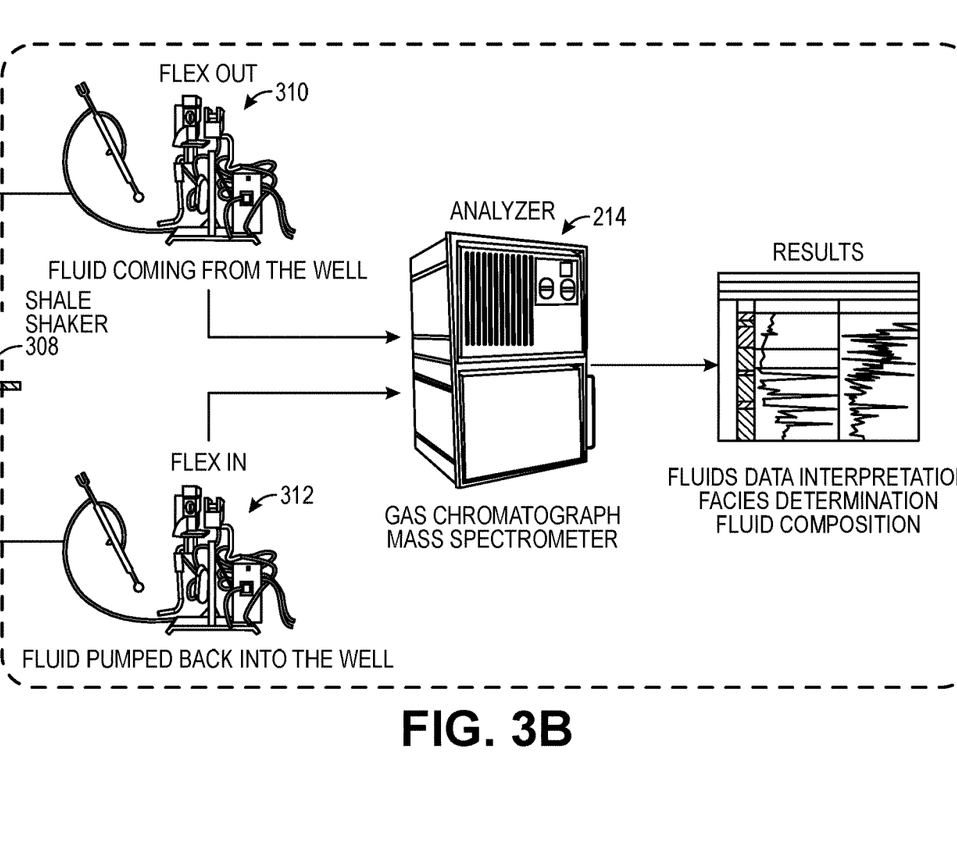

FIGS. 3A and 3B illustrate schematic views of a mud gas analysis process, according to an embodiment. More particularly, FIG. 3A illustrates a schematic side view of a circulation path of the drilling fluid (e.g., mud) 202 between the surface and the downhole environment. The drilling fluid 202 may flow from the pit 204 through a hose 302, a swivel 304, and/or a kelly 306 down into the drill string 208. As mentioned above, the drilling fluid 202 then flows out of the drill bit 210 and then circulates upwardly through an annulus region between the outside of the drill string 208 and the wall of the wellbore 106. When a hydrocarbon-bearing section is encountered during drilling, the drilling fluid 202 contacts and mixes with the reservoir fluid. The drilling fluid 202, carrying the cuttings and reservoir fluid (e.g., HC), then flows up the annulus region to the surface. A shaker (e.g., a shale shaker) 308 at the surface may separate the solids (e.g., cuttings) from the drilling fluid 202, and the (now filtered) drilling fluid 202 may be transferred back to the pit 204.

FIG. 3B illustrates a schematic view of the drilling fluid analyzer 214 and results produced therefrom, according to an embodiment. The analyzer 214 at the surface may sample and analyze the drilling fluid 202. The analyzer 214 may capture one or more first samples of the drilling fluid 202 that flows up and out of the wellbore 106 at the flex out 310 (e.g., before the drilling fluid 202 is filtered by the shale shaker 308). The analyzer 214 may also or instead capture one or more second samples of the drilling fluid 202 that is being pumped into the wellbore 106 at the flex in 312 (e.g., after the drilling fluid 202 is filtered by the shale shaker 308). The analyzer 214 may be or include a gas chromatograph and/or a mass spectrometer.

The results produced by the analyzer 214 may be or include a fluid data interpretation, a facies determination, a fluid composition, or a combination thereof. More particularly, the analyzer 214 may extract and analyze the gas components associated with HC in the reservoir. The gas may be analyzed to quantify the presence, amount, and/or concentration of compounds such as Methane ($C_1$), Ethane ($C_2$), Propane ($C_3$), n-Butane ($nC_4$), iso-Butane ($iC_4$), n-Pentane ($nC_5$), iso-Pentane ($iC_5$), or a combination thereof. The molar gas composition may be matched with the depth from which the HC originated during drilling. The molar gas composition of $C_1$-$C_5$ (in mol %) from AMG may be comparable to the normalized gas composition acquired from fluid analysis laboratory technique.

Fluid Prediction Workflow (FPW)

Figure 4:
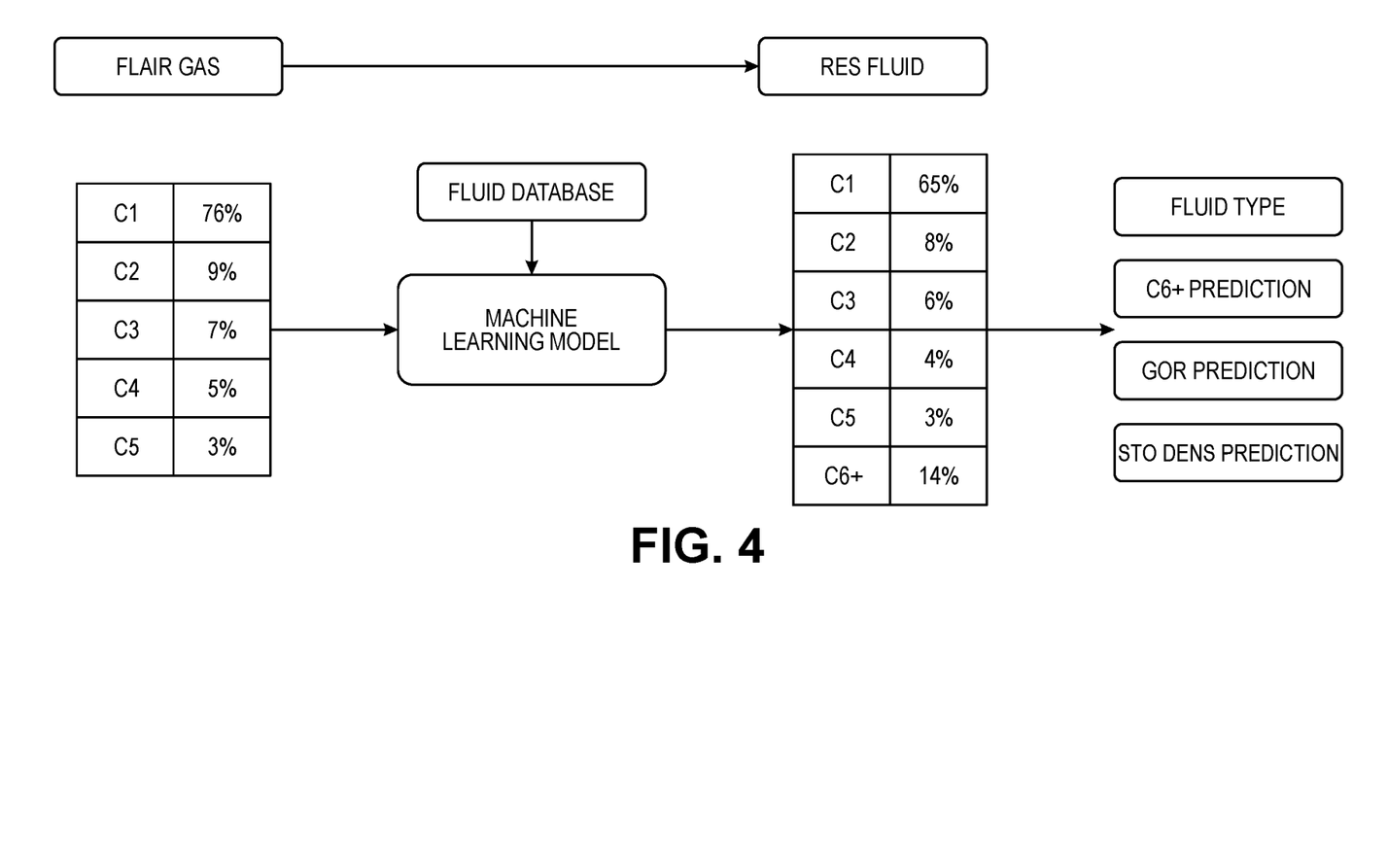
FIG. 4 illustrates a schematic view of a fluid prediction workflow (FPW) that uses results from the mud gas analysis and one or more machine learning (ML) models to estimate fluid type, C6plus, gas-oil-ratio (GOR), or a combination thereof, according to an embodiment.

FIG. 4 illustrates a schematic view of a fluid prediction workflow (FPW), according to an embodiment. The FPW may use the results from the mud gas analysis (in FIGS. 3A and 3B) as inputs. The FPW may process these inputs using one or more machine learning (ML) models to estimate fluid type, fluid composition (e.g., C6plus), gas-oil ratio (GOR), or a combination thereof. More particularly, the models may estimate the heavy fractions of the reservoir fluid and other fluid properties from the normalized gas data. For example, the FPW may estimate the relative amounts of heavier molecules present in the reservoir fluid directly during drilling. The heavier molecules may be considered as one pseudo-group, including organic molecules with six carbons (C6), such as hexane and benzene, and/or more (C6plus) in the molecule. This group of the fluid composition may be referred to as C6plus fraction (C6+) hereafter. The C6+ may be contained in the liquid phase of the reservoir fluid. Such real-time estimation of the heavy fractions of the fluid may be useful in making informed drilling decisions and/or in planning sampling points in the vertical portion 108 of the wellbore 106.

The relative concentration of C6+ (in mole %) in a HC sample is defined as:

$$C6\text{plus}[\text{mol \%}] = \frac{\text{number of moles of components in the } C6\text{plus fraction}}{\text{total number of moles of all components in the } HC} \times 100 \quad \text{(Eq. 1)}$$

Figure 5:
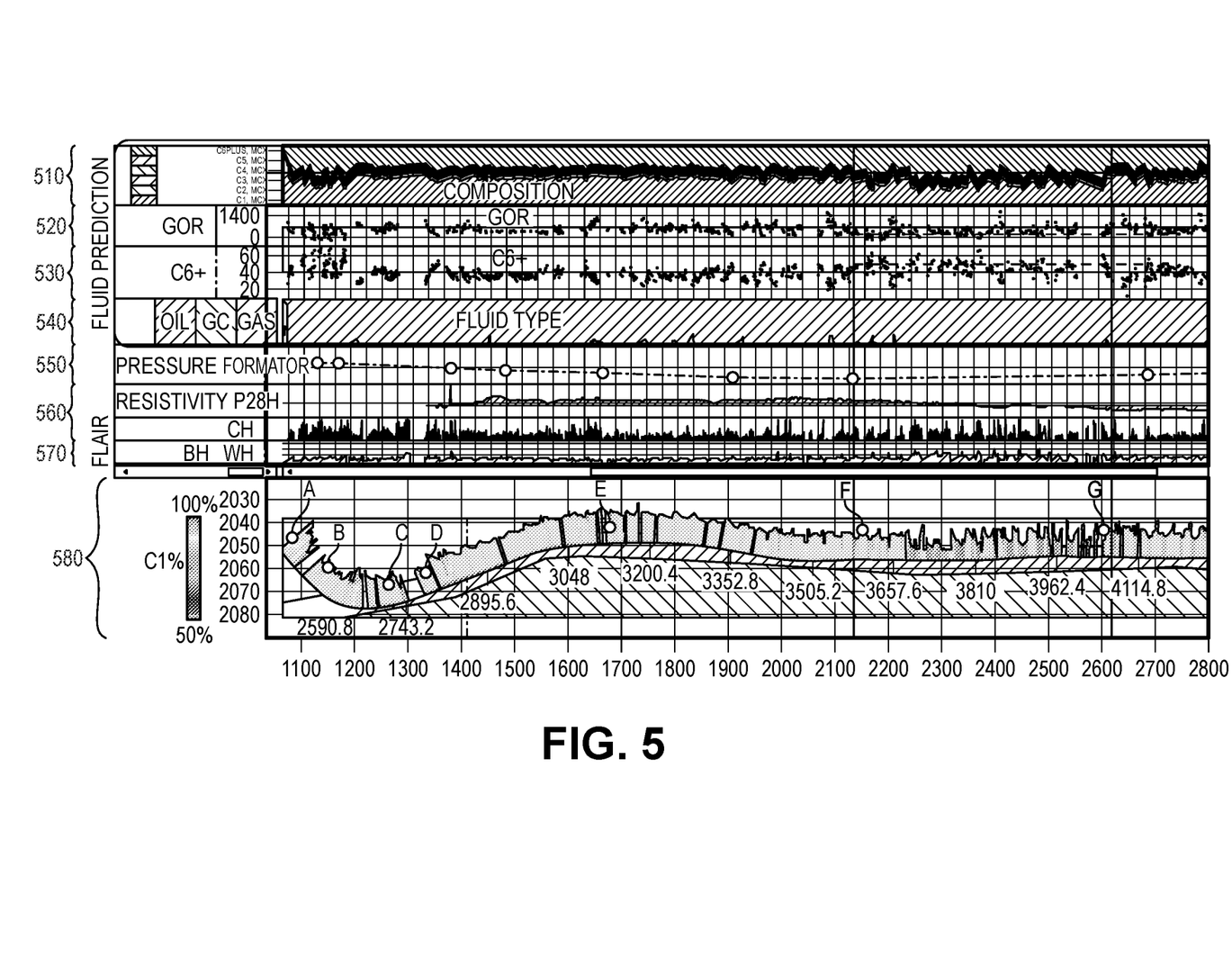
FIG. 5 illustrates a continuous fluid log generated using the FPW that may be used to geosteer a downhole tool at the wellsite, according to an embodiment

The output of the FPW may be a continuous fluid properties log, which may be generated while drilling. FIG. 5 illustrates a continuous fluid properties log 500, according to an embodiment. In an oil-based mud environment where contamination is challenging, this log 500 can be a valuable reference for future calibration and analysis. The fluid properties log 500 may include one or more tracks. As shown, the fluid properties log 500 may include a first track 510 that shows the composition of the drilling fluid 202, a second track 520 that shows the GOR of the drilling fluid 202, a third track 530 that shows the C6+ of the drilling fluid 202, a fourth track 540 that shows the fluid type(s) of the drilling fluid 202, a fifth track 550 that shows a pressure of the drilling fluid 202, a sixth track 560 that shows a resistivity of the drilling fluid 202, a seventh track 570 that shows flair information, and an eighth track 580 that shows Methane ($C_1$ mole %) in reservoir fluid.

Advanced statistical learning tools can be used to build models to predict relative molecular concentration of fluid properties with a given set of input parameters, such as molar gas composition ($C_1$-$C_5$ mole %). Statistical learning refers to a wide range of tools for exploring and understanding data through statistical models. Models may be used for estimating and/or predicting an output based on one or more inputs. A reliable model may be developed by training the model with historical reservoir fluid data. A database containing fluid properties of reservoir fluids can be used to build, train, and validate the statistical models.

The FPW can be used to generate the continuous fluid properties log 500 (e.g., fluid type, C6+ mole %, GOR) along the well trajectory 105. The fluid properties log 500 may provide actionable insight into fluid variability and help to minimize the uncertainties related to fluid distribution resulting from lateral heterogeneities. The fluid properties log 500 may depict the normalized C1 mole % from mud gas measurement to indicate that a C1 concentration increased or decreased in a fluid in a section between the points on the well trajectory 105. However, in an embodiment, such information alone may not be sufficient to understand the fluid variation. Fluid prediction data may show small fluid variation through the well profile, for example, with an average C6+ of 40 mole % and GOR of 700 scf/stb. By monitoring predicted fluid composition (e.g., C1 to C6+ mole %) and/or GOR, the reservoir fluid may be visualized as becoming heavier in that section. The track 540 may show the fluid type probability. This track 540 may show that the fluid is predominantly oil, for example. Trends in fluid properties along the well profile can be used to identify situations when the trajectory 105 approaches a gas cap 122 or to identify movement of gas-oil-contacts 124. The application of such a FPW can be used to predict C6+ and/or GOR. The application may also or instead be used to interpret the fluid variation during geosteering.

Figure 6:
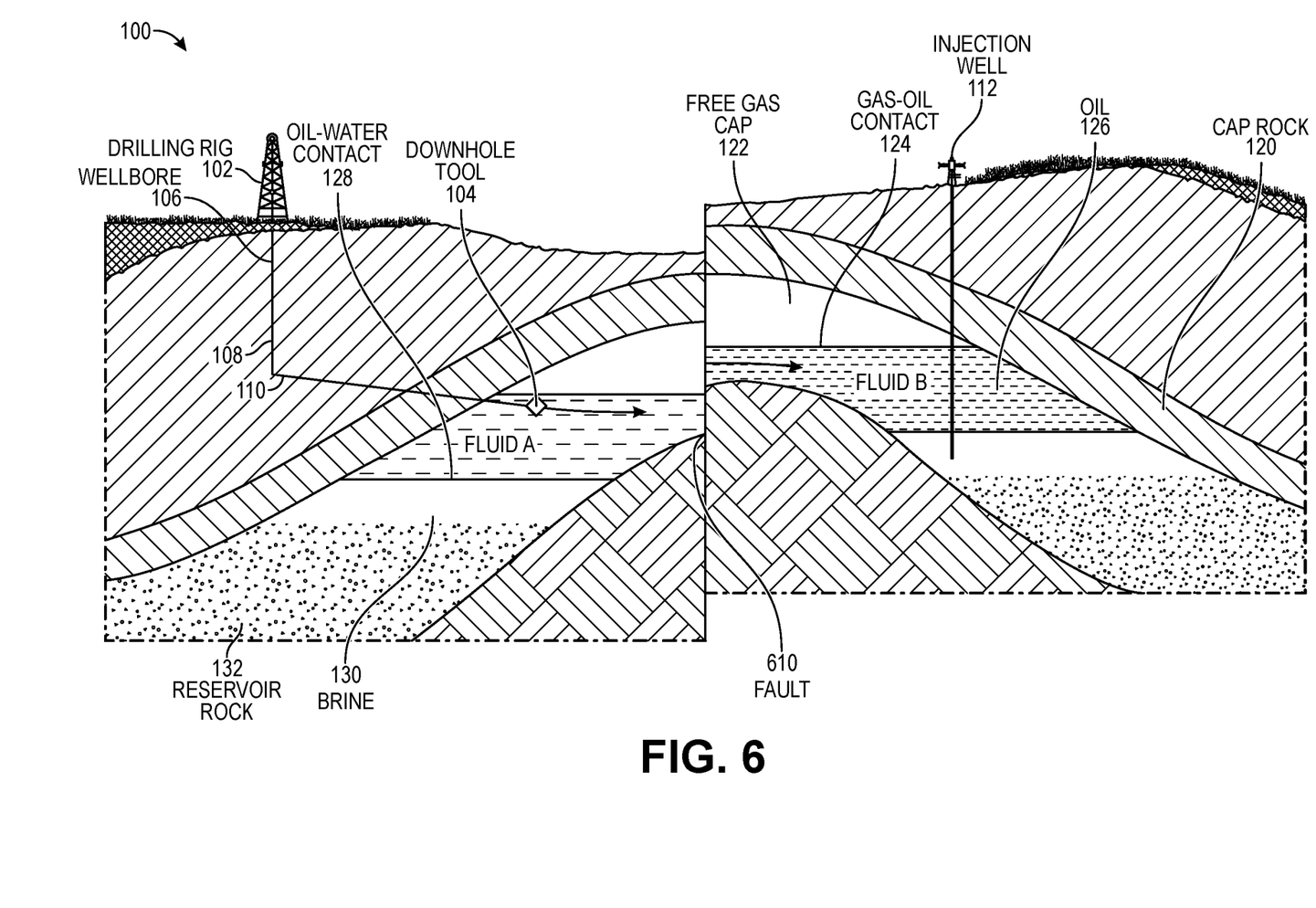
FIG. 6 illustrates a schematic side view of the wellsite showing a fluid variation across a fault, according to an embodiment.

FIG. 6 illustrates a schematic side view of the wellsite 100 showing a fluid variation across a fault 610, according to an embodiment. The fluid properties log 500 along with MWD, LWD, and/or other measurements (e.g., measured by the downhole tool 104 and/or at the surface), can indicate fluid variation across faults or barriers 610, which can have an impact on completion at a later stage. For example, it may be helpful to know that the reservoir fluids across the fault 610 are similar in nature while drilling the horizontal portion 110 of the wellbore 106. The fluid properties log 500 can be helpful in mature fields where migration of fluids due to depletion and advancement of injected gas front increases complexity in making geosteering decisions.

In some FPWs, the models may be trained on a dataset containing a limited number of reservoir fluid samples. In the training data, the sample properties may vary over a wide range of fluid types. However, reservoir fluid properties are not known a priori while drilling. Hence, in exploration wells, it may be difficult to know ahead of time whether a fluid sample encountered in a new reservoir will have characteristics similar to samples in the training dataset. In cases where the new fluid composition is markedly different from the training data, predicted fluid properties may have a degree of uncertainty.

Geosteering workflows may have access to more reliable fluid data from nearby wellbores and pilot wells 112. Such local fluid information can be used to reduce uncertainty in the fluid prediction method using the FPW. The workflow may include the following to update the FPW. First, a fluid prediction may be made from normalized gas data using an existing FPW. The fluid properties may be compared with local fluid data for accuracy. If the predicted properties agree with the local fluid data, the continuous fluid log 500 (e.g., generated by current FPW) may continue to be used to monitor the reservoir fluid in the wellbore 106.

However, if the fluid prediction from the existing FPW is not within a predetermined threshold, the local fluid data may be used to calibrate the fluid predictions. The local fluid data may be used in conjunction with the previously-used training data to train the ML models embedded in the FPW. The number of local fluid samples may be less than the number of samples in the existing database. To increase the influence of the local data in model training, higher weights can be assigned to sparse local data. Prediction accuracy of the retrained models can then be tested. If satisfactory, the FPW can be updated with the new models, and the updated FPW can be used to generate an updated continuous fluid log 500 for the wellbore 106.

Figure 7:
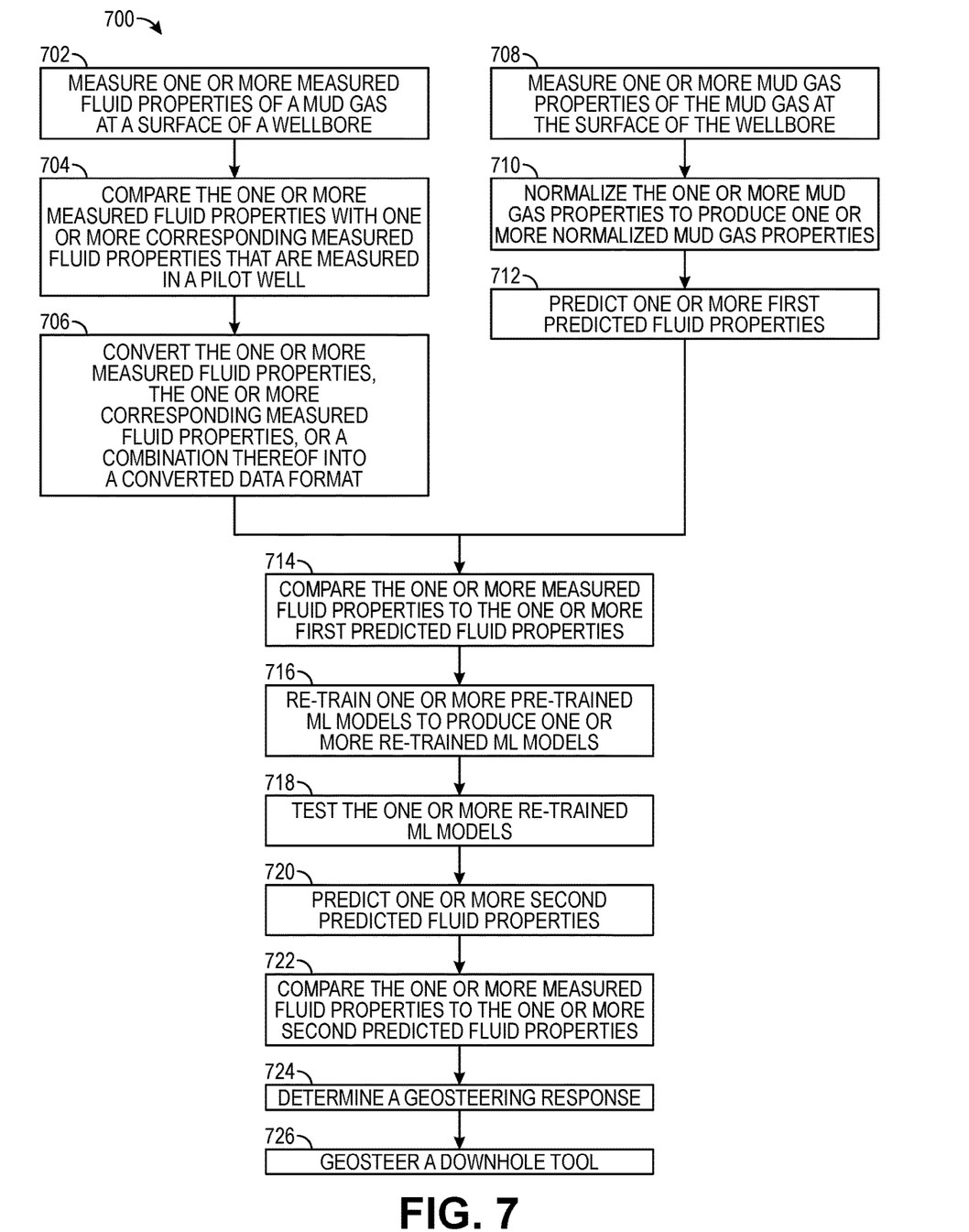
FIG. 7 illustrates a flowchart of a method for predicting fluid properties in a subterranean formation, according to an embodiment.

FIG. 7 illustrates a flowchart of a method 700 for predicting fluid properties in the subterranean formation, according to an embodiment. In one embodiment, the subterranean formation may include fluid composition changes in the target (e.g., oil layer 126) due to faults and/or barriers 610 in the reservoir that create fluid compartmentalization, as shown in FIG. 6. The method 700 may predict and/or estimate reservoir fluid properties from advanced mud gas analysis data, which may be used for well placement and/or geosteering.

An illustrative order of the method 700 is provided below; however, one or more portions of the method 700 may be performed in a different order, combined, split into sub-portions, repeated, or omitted without departing from the scope of the disclosure. One or more portions of the method 700 may be performed by the computing system 800 described below with respect to FIG. 8.

The method 700 may include measuring one or more measured fluid properties of a mud gas at a surface of a wellbore 106, as at 702. As mentioned above, the mud gas may be part of the drilling fluid 202 (e.g., after the drilling fluid 202 is pumped up and out of the wellbore 106). The one or more measured fluid properties may be measured simultaneously with the downhole tool 104 drilling the wellbore 106 in the subterranean formation. The one or more measured fluid properties may include a fluid type, a fluid composition, a gas-oil ratio (GOR), or a combination thereof.

The method 700 may also include comparing the one or more measured fluid properties with one or more corresponding measured fluid properties that are measured in another (e.g., pilot) wellbore 112, as at 704. The wellbore 112 may be drilled before, simultaneously with, or after the wellbore 106. The wellbore 112 may be drilled within 1000 m, within 500 m, within 100 m, or within 50 m of the wellbore 106.

The method 700 may also include converting the one or more measured fluid properties, the one or more corresponding measured fluid properties, or a combination thereof into a converted data format, as at 706. This may be done to match the data format of additional data described below.

The method 700 may also include measuring one or more mud gas properties of the mud gas at the surface of the wellbore 106, as at 708. The one or more mud gas properties may be measured simultaneously with the downhole tool 104 drilling the wellbore 106 in the subterranean formation. The one or more mud gas properties may also or instead be measured simultaneously with the measuring of the one or more measured fluid properties. The one or more mud gas properties may include a composition of molecules in the mud gas, a pressure of the mud gas, a temperature of the mud gas, or a combination thereof.

The method 700 may also include normalizing the one or more mud gas properties to produce one or more normalized mud gas properties, as at 710.

The method 700 may also include predicting one or more first predicted fluid properties, as at 712. The one or more predicted fluid properties may be predicted using one or more pre-trained machine-learning (ML) models. The one or more first predicted fluid properties may be determined based at least partially upon the one or more (e.g., normalized) mud gas properties. The one or more first predicted fluid properties may include the fluid type, the fluid composition, the GOR, or a combination thereof. The one or more pre-trained ML models may include a first pre-trained ML model for the fluid type, a second pre-trained ML model for the fluid composition, a third pre-trained ML model for the GOR, or a combination thereof.

The method 700 may also include comparing the one or more measured fluid properties (from 702) to the one or more first predicted fluid properties (from 712), as at 714. The one or more measured fluid properties may be in the converted data format to match the format of the one or more first predicted fluid properties.

The method 700 may also include re-training the one or more pre-trained ML models to produce one or more re-trained ML models, as at 716. The re-training may be in response to the comparison (at 714). More particularly, the re-training may be in response to the comparison being greater than a first predetermined threshold. In an example, the first predetermined threshold may be a difference between the fluid types (at 714) being greater than a fluid type threshold, a difference between the fluid compositions (at 714) being greater than a fluid composition threshold, a difference between GORs (at 714) being greater than a GOR threshold, or a combination thereof. The re-training may be performed using a first portion (e.g., 80%) of a combined dataset. The combined dataset may include the one or more measured fluid properties (from 702) (e.g., in the converted data format) and/or one or more training fluid properties that were used to train the one or more pre-trained ML models.

The method 700 may also include testing the one or more re-trained ML models, as at 718. The testing may be performed using a second portion (e.g., 20%) of the combined dataset. In an example, testing the one or more re-trained models may include generating one or more outputs using the one or more re-trained ML models based upon one or more inputs. The one or more inputs may include the second portion of the combined data. Testing may also include comparing the one or more outputs with a ground truth of the second portion of the combined dataset.

The method 700 may also include predicting one or more second predicted fluid properties, as at 720. The one or more second predicted fluid properties may include the fluid type, the fluid composition, the GOR, or a combination thereof. The one or more second predicted fluid properties may be predicted using the one or more re-trained ML models. The one or more second predicted fluid properties may be predicted in response to the comparison of the one or more outputs with the ground truth being within a second predetermined threshold. The second predetermined threshold may be different than the first predetermined threshold.

The method 700 may also include comparing the one or more measured fluid properties (from 702) to the one or more second predicted fluid properties (from 720), as at 722. The one or more measured fluid properties may be the converted data format to match the format of the one or more second predicted fluid properties.

The method 700 may also include determining a geosteering response for the downhole tool 104, as at 724. The geosteering response may be determined based at least partially upon the comparison (at 722). The geosteering response may include modifying the drilling trajectory 105 of the downhole tool 104 based at least partially upon the comparison being greater than or less than the first predetermined threshold (from 716).

The method 700 may also include geosteering the downhole tool 104, as at 726. The downhole tool 104 may be geosteered in response to the comparison (from 722), the geosteering response (from 724), or a combination thereof. In one embodiment, geosteering the downhole tool 104 may also or instead include generating a signal (e.g., using the computing system 800) and/or transmitting the signal to the downhole tool 104. The signal may instruct the downhole tool 104 to maintain or modify the drilling trajectory 105 (e.g., to target and/or stay within the oil layer 126).

Figure 8:
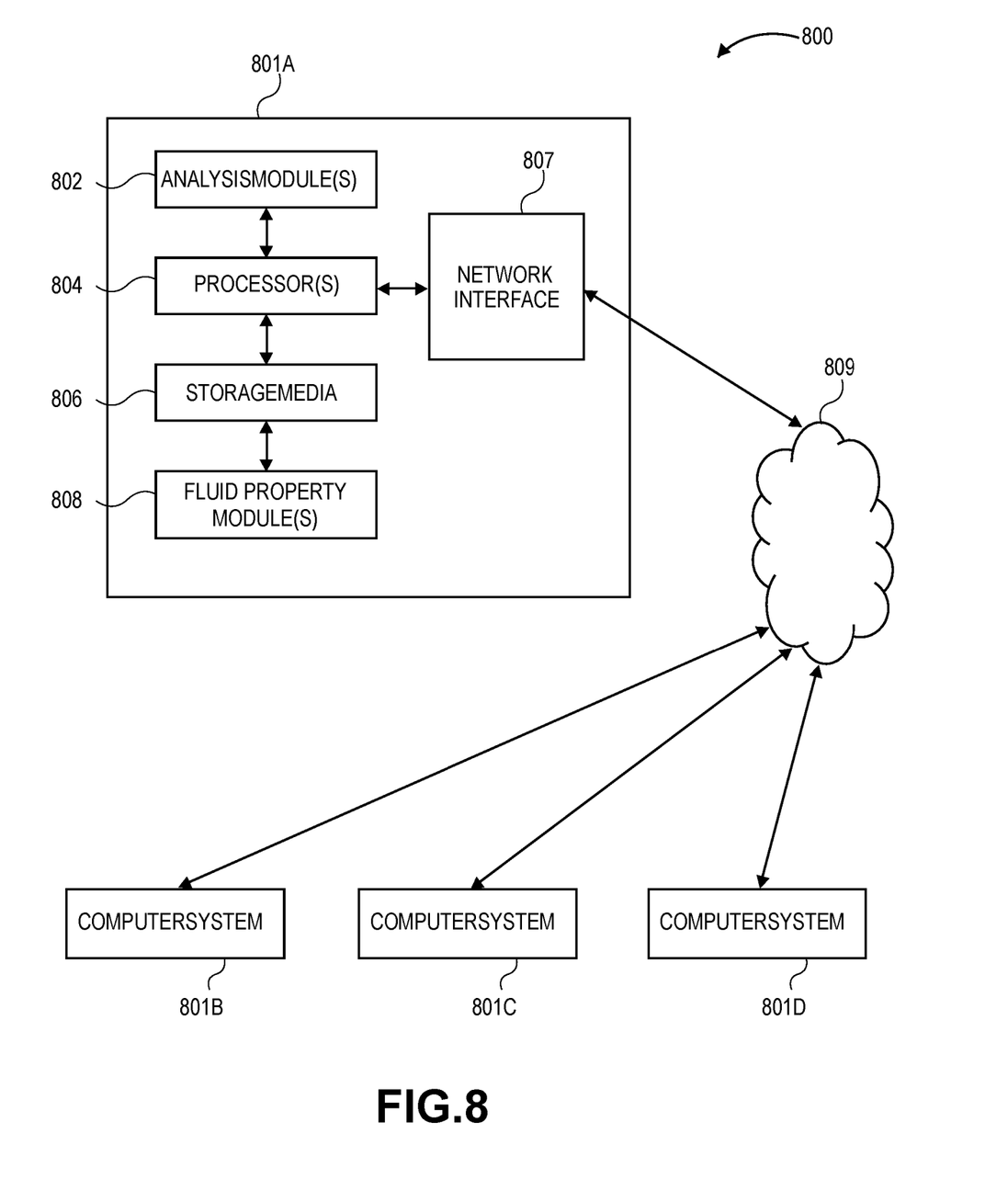
FIG. 8 illustrates a computing system for performing at least a portion of the method, in accordance with some embodiments.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more fluid property module(s) 808 configured to perform at least a portion of the method 700. It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for predicting fluid properties, the method comprising:
measuring one or more measured fluid properties of a mud gas at a surface of a wellbore;
measuring one or more mud gas properties of the mud gas at the surface of the wellbore;
predicting one or more first predicted fluid properties using one or more pre-trained machine-learning (ML) models, wherein the one or more first predicted fluid properties are predicted based at least partially upon the one or more mud gas properties;
comparing the one or more measured fluid properties to the one or more first predicted fluid properties;
re-training the one or more pre-trained ML models to produce one or more re-trained ML models in response to the comparison;
predicting one or more second predicted fluid properties using the one or more re-trained ML models, the one or more second predicted fluid properties comprise a fluid type, a fluid composition, a gas-oil ratio (GOR), or a combination thereof;
comparing the one or more measured fluid properties to the one or more second predicted fluid properties; and
determining a geosteering response for a downhole tool that is drilling the wellbore in response to the comparison being less than a predetermined threshold.

2. The method of claim 1, wherein the one or more measured fluid properties and the one or more first predicted fluid properties comprise a fluid type, a fluid composition, a gas-oil ratio (GOR), or a combination thereof.

3. The method of claim 1, wherein the one or more measured fluid properties comprise a fluid composition, and wherein the fluid composition comprises a relative amount of organic molecules with six or more carbons in the mud gas.

4. The method of claim 1, wherein the one or more mud gas properties comprise a composition of molecules in the mud gas, a pressure of the mud gas, a temperature of the mud gas, or a combination thereof.

5. The method of claim 1, wherein the one or more measured fluid properties and the one or more mud gas properties are measured while the downhole tool that is drilling the wellbore is in a deviated portion or a lateral portion of the wellbore.

6. The method of claim 1, wherein the one or more re-trained ML models are produced in response to the comparison being greater than the predetermined threshold.

7. The method of claim 1, further comprising generating a signal with geosteering instructions for the downhole tool that is drilling the wellbore based at least partially upon the one or more re-trained ML models.

8. The method of claim 1, further comprising geosteering the downhole tool that is drilling the wellbore within a subterranean formation based at least partially upon the one or more re-trained ML models.

9. A non-transitory computer-readable medium storing instructions that, when executed by at least one processor of a computing system, cause the computing system to perform operations, the operations comprising:
- measuring one or more measured fluid properties of a mud gas at a surface of a wellbore, wherein the one or more measured fluid properties comprise a fluid type, a fluid composition, a gas-oil ratio (GOR), or a combination thereof, and wherein the wellbore comprises a deviated or lateral wellbore;
- measuring one or more mud gas properties of the mud gas at the surface of the wellbore, wherein the one or more mud gas properties comprise a composition of molecules in the mud gas, a pressure of the mud gas, a temperature of the mud gas, or a combination thereof;
- predicting one or more first predicted fluid properties using one or more pre-trained machine-learning (ML) models, wherein the one or more first predicted fluid properties are predicted based at least partially upon the one or more mud gas properties, and wherein the one or more first predicted fluid properties comprise the fluid type, the fluid composition, and the GOR;
- performing a first comparison of the one or more measured fluid properties to the one or more first predicted fluid properties;
- re-training the one or more pre-trained ML models to produce one or more re-trained ML models in response to the first comparison being greater than a first predetermined threshold;
- predicting one or more second predicted fluid properties using the one or more re-trained ML models, wherein the one or more second predicted fluid properties comprise the fluid type, the fluid composition, the GOR, or a combination thereof;
- performing a second comparison of the one or more measured fluid properties to the one or more second predicted fluid properties; and
- determining a geosteering response for a downhole tool that is drilling the wellbore in response to the second comparison being less than the first predetermined threshold.

10. The non-transitory computer-readable medium of claim 9, further comprising converting the one or more measured fluid properties into a converted data format, wherein the one or more measured fluid properties in the converted data format are compared to the one or more first predicted fluid properties and to the one or more second predicted fluid properties.

11. The non-transitory computer-readable medium of claim 9, further comprising generating a signal with geosteering instructions for the downhole tool based at least partially upon the geosteering response.

12. The non-transitory computer-readable medium of claim 9, wherein the re-training is performed using a first portion of a combined dataset, and further comprising testing the one or more re-trained ML models using a second portion of the combined dataset, wherein the combined dataset comprises the one or more measured fluid properties and one or more training fluid properties that were used to train the one or more pre-trained ML models.

13. The non-transitory computer-readable medium of claim 12, wherein the first portion is greater than the second portion.

14. A computing system, comprising:
- one or more processors; and
- a memory system comprising one or more non-transitory computer-readable media storing instructions that, when executed by at least one of the one or more processors, cause the computing system to perform operations, the operations comprising:
  - measuring one or more measured fluid properties of a mud gas at a surface of a wellbore, wherein the one or more measured fluid properties comprise a fluid type, a fluid composition, a gas-oil ratio (GOR), or a combination thereof, and wherein the wellbore comprises a deviated or lateral wellbore;
  - comparing the one or more measured fluid properties with one or more corresponding measured fluid properties that are measured in a pilot well;
  - converting the one or more measured fluid properties, the one or more corresponding measured fluid properties, or a combination thereof into a converted data format;
  - measuring one or more mud gas properties of the mud gas at the surface of the wellbore, wherein the one or more mud gas properties comprise a composition of molecules in the mud gas, a pressure of the mud gas, a temperature of the mud gas, or a combination thereof;
  - normalizing the one or more mud gas properties to produce one or more normalized mud gas properties;
  - predicting one or more first predicted fluid properties using one or more pre-trained machine-learning (ML) models, wherein the one or more first predicted fluid properties are predicted based at least partially upon the one or more normalized mud gas properties, wherein the one or more first predicted fluid properties comprise the fluid type, the fluid composition, the GOR, or a combination thereof;
  - performing a first comparison of the one or more measured fluid properties in the converted data format to the one or more first predicted fluid properties;
  - re-training the one or more pre-trained ML models to produce one or more re-trained ML models in response to the first comparison being greater than a first predetermined threshold;
  - predicting one or more second predicted fluid properties using the one or more re-trained ML models, wherein the one or more second predicted fluid properties comprise the fluid type, the fluid composition, the GOR, or a combination thereof;
  - performing a second comparison of the one or more measured fluid properties in the converted data format to the one or more second predicted fluid properties; and
  - determining a geosteering response for a downhole tool that is drilling the wellbore in response to the second comparison being less than the first predetermined threshold.

15. The computing system of claim 14, wherein the one or more pre-trained ML models comprises a first pre-trained ML model for the fluid type, a second pre-trained ML model for the fluid composition, and a third pre-trained ML model for the GOR.

16. The computing system of claim 14, further comprising transmitting a signal with geosteering instructions to the downhole tool based at least partially upon the geosteering response.

17. The computing system of claim 14, wherein the re-training is performed using a first portion of a combined dataset, and wherein the combined dataset comprises the one or more measured fluid properties in the converted data format and one or more training fluid properties that were used to train the one or more pre-trained ML models.

18. The computing system of claim 17, further comprising testing the one or more re-trained ML models comprising:

generating one or more outputs using the one or more re-trained ML models based upon one or more inputs, wherein the one or more inputs comprise a second portion of the combined dataset; and comparing the one or more outputs with a ground truth of the second portion of the combined dataset, wherein the one or more second predicted fluid properties are predicted in response to the comparison of the one or more outputs with the ground truth being within a second predetermined threshold.

* * * * *